Sept. 26, 1933.   G. MUSTICO   1,928,570
PIPE CLAMP
Filed May 13, 1931

George Mustico, INVENTOR
BY Victor J. Evans & Co.
ATTORNEY

Patented Sept. 26, 1933

1,928,570

UNITED STATES PATENT OFFICE 1,928,570

PIPE CLAMP

George Mustico, Newburgh, N. Y.

Application May 13, 1931. Serial No. 537,183

1 Claim. (Cl. 285—194)

This invention relates to pipe clamps for stopping leaks in pipes.

An object of the invention is the provision of a pipe clamp adaptable to fit over a wide range of pipes.

Another object is the provision of a pipe clamp which does not require tools to apply the same or remove the same from a pipe.

Other objects will be appreciated by reading the following specification.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

Figure 1:
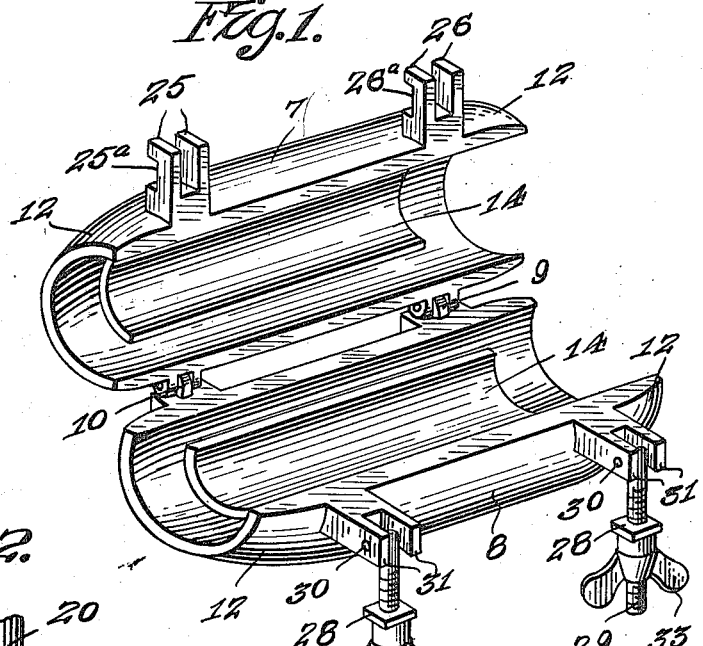
Fig. 1 is a perspective view of my improved clamp in open position.

Referring to the drawing for a more detailed description thereof, the clamp comprises a pair of cooperating substantially semi-cylindrical members 7 and 8 hingedly connected together at 9 and 10. The ends of the clamp members are tapered as indicated by the numeral 12. Recesses are formed on the inner faces of the members 7 and 8 and into these recesses are removably fitted pads 14 which project beyond the inner surfaces of said members. Said pads are of water-proof material and preferably resilient material such for example as rubber, although they may be made of any suitable material. The mentioned recesses are formed so as to provide projections 15 which overlie the reduced edges of the pads 14 to hold the latter securely to the clamp members.

Figure 4:
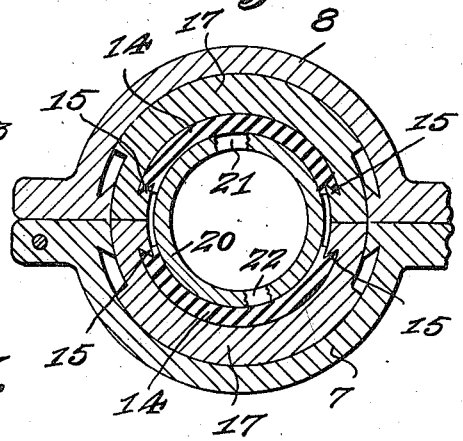
Fig. 4 is a cross section of a modified form of my invention, the same being shown encircling a damaged pipe.

In Fig. 4, it shows a modified form of clamp, instead of positioning the pads in the inner faces of the clamping members 7 and 8, I position said pads in the inner faces of semi-cylindrical reducing members 17 in the same manner as positioned in the clamping members and as described. Said reducing members 17 are positioned in the clamping members 7 and 8 in the same manner as the mentioned pads 14 are positioned in the reducing members, there being recesses in the inner faces of the clamping members to accommodate the reducing members. Said reducing members are removable so that such members may be replaced by similar members of different thicknesses, whereby the clamp may be made suitable for pipes of various sizes.

Figure 2:
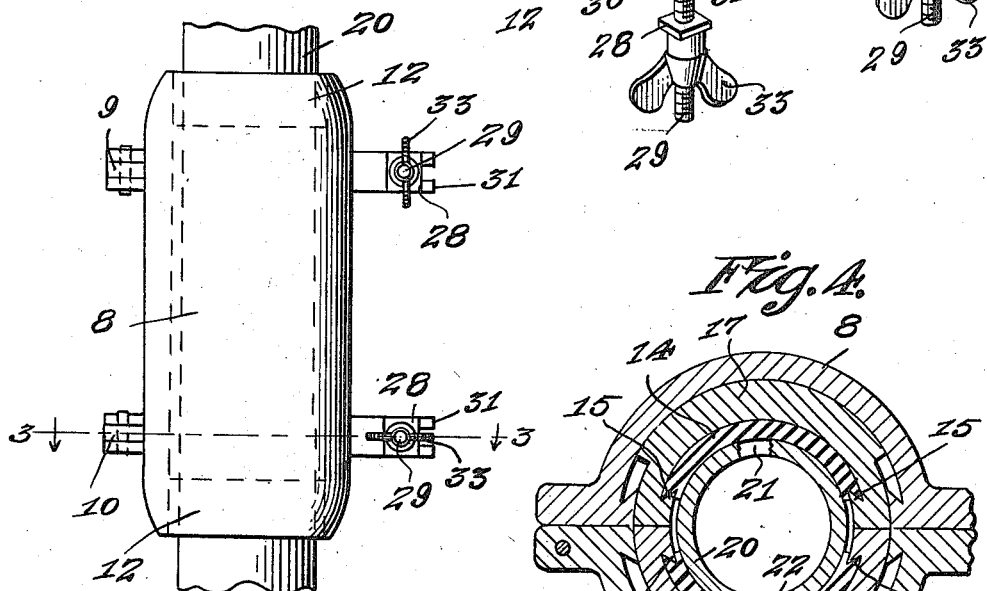
Fig. 2 is a plane view of the clamp showing the same around a pipe.
Figure 3:
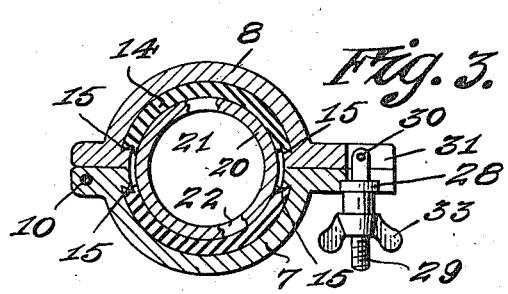
Fig. 3 is a vertical section taken on line 3—3 of Fig. 2, this view showing a damaged pipe enclosed by the clamp.

Figs. 2, 3 and 4 show a clamp enclosing a pipe 20 damaged at the points 21 and 22 so as to leak unless a clamp is applied thereto. The clamp however prevents the pipe from leaking when the semi-cylindrical clamping members are held together by fastening means presently described.

The fastening means adapted to hold the clamp tightly on the pipe 20 comprise a pair of lugs 25 in another pair of lugs 26 projecting from a side of the clamping member 7. The lugs 25 are parallel and spaced apart and the lugs 26 are similar. The lugs 25 and 26 are provided with notches 25a and 26a respectively, and these notches are adapted to be fitted by washers 28 carried on threaded members 29 pivoted at 30 between pairs of lugs 31 projecting from the side of the clamping member 8. Wing nuts 33 threadedly engage the threaded members 29 and are swingable between the pair of lugs 25 and between the pair of lugs 26. Said wing nuts are adapted to tighten the washers 28 on the lugs 25 and 26 in the notches 25a and 26a, respectively.

What is claimed as new is:

A repair clamp comprising a pair of clamping members, a replaceable reducer seated in the inner surface of each member and a pad seated in the inner face of each reducer, said members being hinged at one side and provided with a pair of clamping means at their other side, said clamping means each comprising notched lugs on one of said members, a pivoted threaded bolt on the other member, a non-circular washer on the bolt adapted to be seated in the notched lugs and a wing nut adapted to hold the washer in the lugs.

GEORGE MUSTICO.